(12) United States Patent
Chang et al.

(10) Patent No.: US 7,822,999 B2
(45) Date of Patent: Oct. 26, 2010

(54) COMPUTER SYSTEM AND METHOD FOR CONTROLLING A PROCESSOR THEREOF

(75) Inventors: Li-Hung Chang, Hsinchu (TW);
Hong-Men Su, Hsinchu County (TW);
Chuan-Hua Chang, Taipei (TW)

(73) Assignee: Andes Technology Corporation, Hsin-Chu (TW)

( * ) Notice: Subject to any disclaimer, the term of this patent is extended or adjusted under 35 U.S.C. 154(b) by 754 days.

(21) Appl. No.: 11/757,411

(22) Filed: Jun. 4, 2007

(65) Prior Publication Data
US 2008/0301480 A1 Dec. 4, 2008

(51) Int. Cl.
G06F 1/00 (2006.01)
G06F 1/26 (2006.01)
G11C 5/14 (2006.01)
H04B 1/38 (2006.01)

(52) U.S. Cl. ............... 713/323; 713/300; 713/320; 365/227; 455/574

(58) Field of Classification Search .......... 713/300, 713/320, 323; 365/227; 455/574
See application file for complete search history.

(56) References Cited

U.S. PATENT DOCUMENTS 6,754,837 B1 * 6/2004 Helms ............... 713/322
2003/0218494 A1 * 11/2003 Kubo et al. .......... 327/534

* cited by examiner

*Primary Examiner*—Mark Connolly
*Assistant Examiner*—Stefan Stoynov
(74) *Attorney, Agent, or Firm*—Jianq Chyun IP Office

(57) ABSTRACT

A computer system and a method for controlling a processor thereof are provided. A processor management unit (PMU) is programmed by the processor itself or by another processor according to a change of the operating condition of the processor. Then, a notification signal is sent to the PMU by the processor when the processor is entering a standby mode. Upon receiving the notification signal, the PMU adjusts the operating condition of the processor according to the change. Finally, a completion signal is sent by the PMU to the processor after the change of the operating condition of the processor is stabilized. Therefore, the unpredictable behavior caused by premature awakening of the processor during the adjustment of the operating condition can be avoided.

12 Claims, 4 Drawing Sheets

COMPUTER SYSTEM AND METHOD FOR CONTROLLING A PROCESSOR THEREOF

BACKGROUND OF THE INVENTION

1. Field of the Invention

The present invention relates to a computer system and a method for controlling a processor thereof. More particularly, the present invention relates to a computer system and a method for controlling a processor to avoid an unpredictable behavior during adjusting the operating condition of the processor.

2. Description of the Related Art

When a processor in a computer system has to change to another operating mode, generally the operating condition of the processor has to be adjusted accordingly, and the task of adjusting the operating condition is usually done by another device. For instance, when a modern processor gets no task to do, it usually enters a standby mode, where it turns off most of its circuit except a small portion to wait for external wakeup events to bring it back to a consistent operating mode. When the processor prepares to enter the standby mode, the processor communicates with a processor management unit (PMU) for its new operating condition including supply voltage and/or operating frequency, and the PMU starts the adjustment of the operating condition after the processor enters the standby mode.

Most of the modern processors have a standby notification signal going out to the PMU in order to notify the PMU to start adjusting the operating condition, but there is no signal going from the PMU to the processor to notify the processor that the adjustment of the operating condition is complete. As a result, if a wakeup event, such as an interrupt, arrives when the processor is in the standby mode and the PMU is still adjusting the operating condition, the processor may wakeup prematurely and be forced to work with inconsistent operating condition. Unpredictable behaviours such as race condition and instability might happen.

In order to prevent such unpredictable behaviours, a conventional solution is using an ad hoc system level logic circuit outside the processor for blocking wakeup events during the adjustment of the operating condition. However, there are many sources which can send wakeup events to the processor, thus the system level logic circuit has to block these wakeup events in different ways according to the different sources. In addition, the system level logic circuit has to detect whether the adjustment of the operating condition is complete. As a result, the complexity of the system level logic circuit is high. Besides, the design of the system level logic circuit is also limited to the interfaces of the existing functions provided by the processor and the PMU. Consequently, the flexibility of blocking wakeup events is also limited. Without an integrated mechanism to solve the problem of premature awakening, unpredictable behaviours might happen and both the stability and the reliability of the entire computer system will be affected.

SUMMARY OF THE INVENTION

Accordingly, the present invention is directed to a method for controlling a processor, which prevents the unpredictable behaviours resulting from premature awakening by an exchange of signals between the processor and the processor management unit.

The present invention is also directed to a computer system, which uses a handshaking mechanism to ensure the processor awakens after the stabilization of the change of its operating condition.

According to an embodiment of the present invention, a method for controlling a processor is provided. The method for controlling the processor includes the following steps. First, a processor management unit (PMU) is programmed by the processor or other processors according to a change of the required new operating condition of the processor. Then, a notification signal is sent to the PMU by the processor when the processor is entering a standby mode. Upon receiving the notification signal, the PMU starts adjusting the operating condition of the processor according to the newly specified operating condition. Finally, a completion signal is sent by the PMU to the processor after the change of the operating condition of the processor is stabilized.

In the method for controlling the processor according to an embodiment of the present invention, the processor enters the standby mode by executing a standby instruction, and the standby instruction has three option modes. In the first option mode, the processor enters the standby mode, sends the notification signal to the PMU, and starts monitoring wakeup events upon receiving the completion signal from the PMU. In the second option mode, the processor enters the standby mode, sends the notification signal to the PMU, and wakes up upon receiving the completion signal from the PMU. In the third option mode, the processor enters the standby mode without sending the notification signal, and then starts monitoring wakeup events.

In the method for controlling the processor according to an embodiment of the present invention, the processor enters the standby mode by writing a predetermined value into a standby control register. The predetermined value is a first value, a second value or a third value. If the standby control register is written with the first value, the processor enters the standby mode, sends the notification signal to the PMU, and starts monitoring wakeup events upon receiving the completion signal from the PMU. If the standby control register is written with the second value, the processor enters the standby mode, sends the notification signal to the PMU, and wakes up upon receiving the completion signal from the PMU. If the standby control register is written with the third value, the processor enters the standby mode without sending the notification signal, and then starts monitoring wakeup events.

In the method for controlling the processor according to an embodiment of the present invention, the operating condition of the processor includes at least one of the following: a supply voltage of the processor, an operating frequency of the processor, a register value of the processor, and an operating parameter of the processor. The operating parameter may be stored in the processor, in other processors, or in a storage element.

In the method for controlling the processor according to an embodiment of the present invention, the processor comprises a plurality of function units and the operating condition of the processor includes the on/off states of the function units.

In the method for controlling the processor according to an embodiment of the present invention, the processor comprises a plurality of independent execution units and the operating condition of the processor includes the on/off states of the independent execution units.

According to another embodiment of the present invention, a computer system is provided. The computer system includes one or more than one processors and a processor management unit (PMU). The PMU is programmed by the processor or other processors according to a change of the operating condition of the processor. The processor, about to change the operating condition, enters a standby mode, and sends a notification signal to the PMU. The PMU starts adjusting the operating condition of the processor according to the change upon receiving the notification signal, and then sends a completion signal to the processor after the change of the operating condition of the processor is stabilized.

In the computer system according to an embodiment of the present invention, the processor enters the standby mode by executing a standby instruction. The standby instruction has three option modes. In the first option mode, the processor enters the standby mode, sends the notification signal to the PMU, and starts monitoring wakeup events upon receiving the completion signal from the PMU. In the second option mode, the processor enters the standby mode, sends the notification signal to the PMU, and wakes up upon receiving the completion signal from the PMU. In the third option mode, the processor enters the standby mode without sending the notification signal, and then starts monitoring wakeup events.

In the computer system according to an embodiment of the present invention, the processor enters the standby mode by writing a predetermined value into a standby control register. The predetermined value is a first value, a second value or a third value. If the standby control register is written with the first value, the processor enters the standby mode, sends the notification signal to the PMU, and starts monitoring wakeup events upon receiving the completion signal from the PMU. If the standby control register is written with the second value, the processor enters the standby mode, sends the notification signal to the PMU, and wakes up upon receiving the completion signal from the PMU. If the standby control register is written with the third value, the processor enters the standby mode without sending the notification signal, and then starts monitoring wakeup events.

In the computer system according to an embodiment of the present invention, the operating condition of the processor includes at least one of the following: a supply voltage of the processor, an operating frequency of the processor, a register value of the processor, and an operating parameter of the processor. The operating parameter may be stored in the processor, in other processors, or in a storage element.

In the computer system according to an embodiment of the present invention, the processor comprises a plurality of function units and the operating condition of the processor includes the on/off states of the function units.

In the computer system according to an embodiment of the present invention, the processor comprises a plurality of independent execution units and the operating condition of the processor includes the on/off states of the independent execution units.

In the computer system and the method for controlling the processor thereof, a handshaking mechanism between the processor and the PMU is used during the adjustment of the operating condition of the processor. This handshaking mechanism prevents the premature termination of the adjustment of the operating condition and ensures that the processor awakens after the stabilization of its new operating condition.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
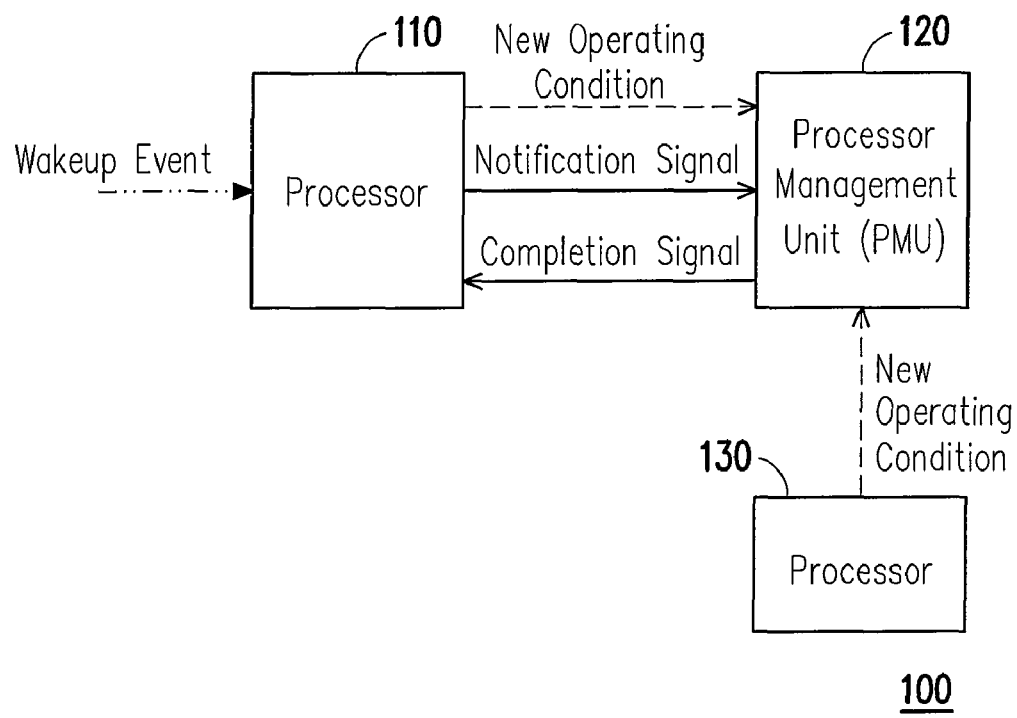
FIG. 1 is a block diagram of a computer system according to an embodiment of the present invention.

When the operating condition of a processor in a computer system needs to be changed, if the processor does not resume normal operation until the operating condition is stabilized, an unpredictable behavior of the computer system such as race condition can be avoided. Therefore, a computer system and a method for controlling a processor thereof are provided in the present invention. Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a computer system according to an embodiment of the present invention. Referring to FIG. 1, the computer system 100 of this embodiment includes a processor 110, a processor management unit (PMU) 120 and another processor 130. Sometimes the processor 110 needs to change its operating condition. For example, the processor 110 may shut down part of its circuit to operate with a lower supply voltage and a lower clock frequency, or the processor 110 may need new operating parameters such as starting address. When the operating condition needs to be changed, the processor 110 itself or another processor 130 programs the PMU 120 according to the change of the operating condition, and then the processor 110 enters a standby mode and sends a notification signal to the PMU 120. Upon receiving the notification signal, the PMU 120 adjusts the operating condition of the processor 110 according to the change, and then sends a completion signal to inform the processor 110 that it is safe to wake up and resume normal operation.

In one embodiment of the present invention, the operating condition of the processor 110 may include supply voltage of the processor 110, operating frequency of the processor 110, register values of the processor 110, or operating parameters of the processor 110 which may be stored in the processor 110, another processor 130 or in a memory of the computer system 100 (not shown). Moreover, the processor 110 may include several function units (e.g., the Arithmetic and Logic Unit, ALU), and the operating condition of the processor 110 may include the on/off states of the function units. Alternatively, the processor 110 may include several independent execution units. Each independent execution unit has its own instruction pipeline for parallel execution. In this case, the operating condition of the processor 110 may include the on/off states of the independent execution units.

The processor 110 may enter the standby mode by executing a standby instruction or by writing a predetermined value into a standby control register. There are three option modes of the standby instruction, and the predetermined value may be selected among a first value, a second value and a third value. The three predetermined values are corresponding to the three option modes of the standby instruction. Executing the standby instruction with the first option mode is equivalent to writing the first value into the standby control register. Executing the standby instruction with the second option mode is equivalent to writing the second value into the standby control register. Executing the standby instruction with the third option mode is equivalent to writing the third value into the standby control register.

In the first option mode (or if the standby control register is written with the first value), the processor 110 enters the standby mode, sends the notification signal to the PMU 120, and starts monitoring wakeup events upon receiving the completion signal sent from the PMU 120. In this option mode, only a small portion of circuit of the processor 110 is used for monitoring the wakeup events, thus the operating condition of the processor 110 can be adjusted to the lowest power. It should be noted that any wakeup event (e.g., interrupts triggered by key presses of the keyboard or incoming network packets) coming to the processor 110 after the processor 110 enters the standby mode and before the processor 110 monitors wakeup events is simply ignored, thereby preventing premature awakening of the processor 110.

In the second option mode (or if the standby control register is written with the second value), the processor 110 enters the standby mode, sends the notification signal to the PMU 120, and wakes up immediately upon receiving the completion signal sent from the PMU 120. As a result, the operation of the processor 110 can be resumed immediately after the adjustment of the operating condition is completed. Similar to the first option mode, any wakeup event coming to the processor 110 after the processor 110 enters the standby mode and before the processor 110 receives the completion signal from the PMU 120 is simply ignored, thereby preventing premature awakening of the processor 110.

In the third option mode (or if the standby control register is written with the third value), the processor 110 enters the standby mode without sending any notification signal to the PMU 120, and then starts monitoring wakeup events. This option mode may be used when the processor 110 needs to wait for a wakeup event without changing its operating condition. As a result, the third option mode of the standby instruction may be used to replace conventional idle waiting loops executed by the processor 110 to save power.

Figure 2:
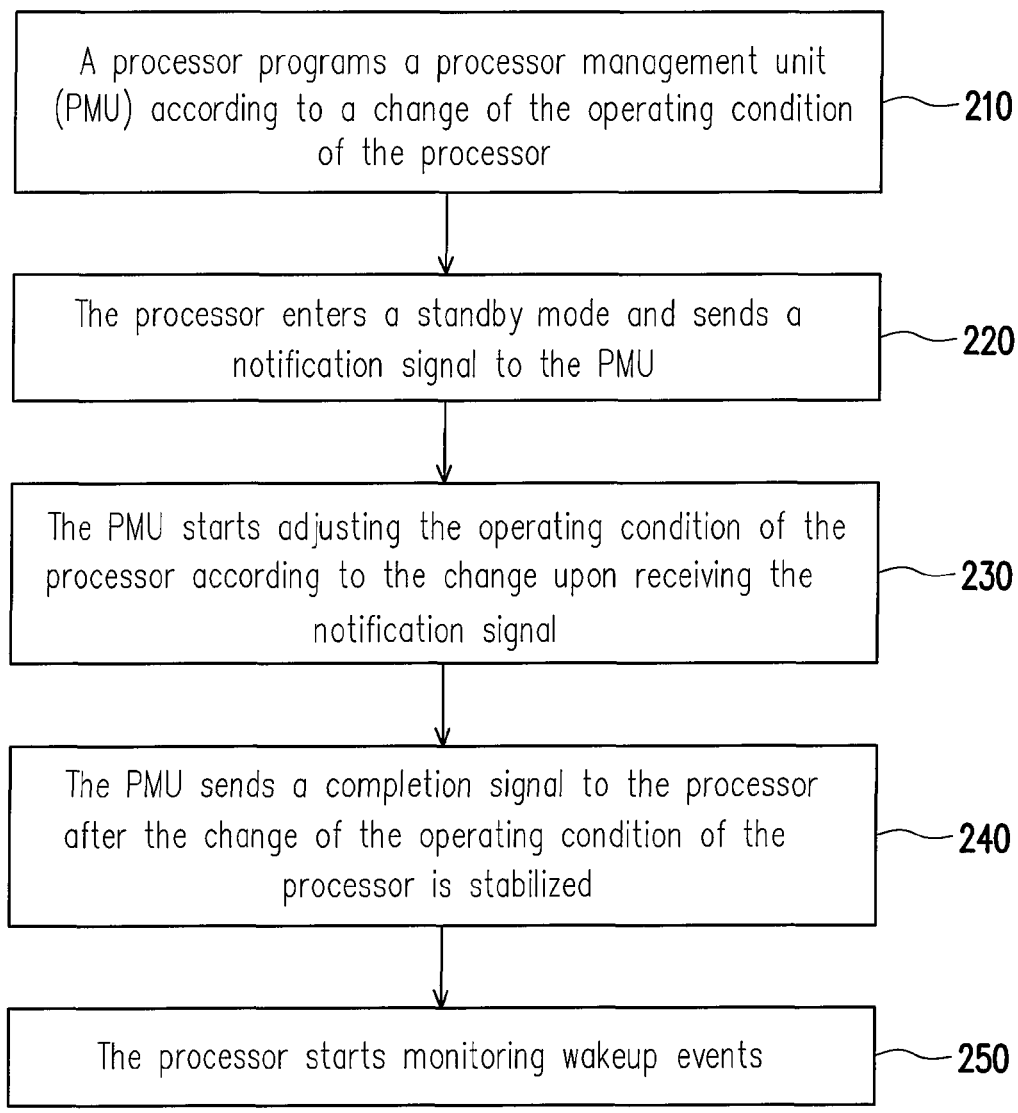
FIGS. 2-4 are flow charts of several variations of a method for controlling a processor according to an embodiment of the present invention.

In order to clarify the handshaking mechanism between the processor 110 and the PMU 120, a method for controlling the processor 110 in the computer system 100 is further illustrated. FIG. 2 is a flow chart of a method for controlling the processor 110 according to the first option mode of the standby instruction in this embodiment. Referring to FIG. 2, in step 210, the processor 110 or another processor 130 programs the PMU 120 according to the pending change of the operating condition of the processor 110. For instance, the processor 110 or another processor 130 may program the PMU 120 with the parameters of the new operating condition through an input/output bus.

Next, in step 220, the processor 110 performs all required state saving then enters a standby mode and sends a notification signal to the PMU 120. As mentioned above, the processor 110 may enter the standby mode by executing the standby instruction with the first option mode or by writing the first value into the standby control register.

In step 230, when the notification signal is received by the PMU 120, the PMU 120 starts adjusting the operating condition of the processor according to the change of the operating condition which the processor 110 or another processor 130 informed the PMU 120 of in step 210. In step 240, a completion signal is sent from the PMU 120 to the processor 110 after the change of the operating condition of the processor 110 is stabilized. It should be noted that, the processor 110 ignores all wakeup events after entering the standby mode until receiving the completion signal.

Finally, in step 250, after the processor 110 receives the completion signal, the processor 110 starts monitoring wakeup events. From now on, any incoming wakeup event wakes up the processor 110. The processor 110 works with the new operating condition after awakening.

Figure 3:
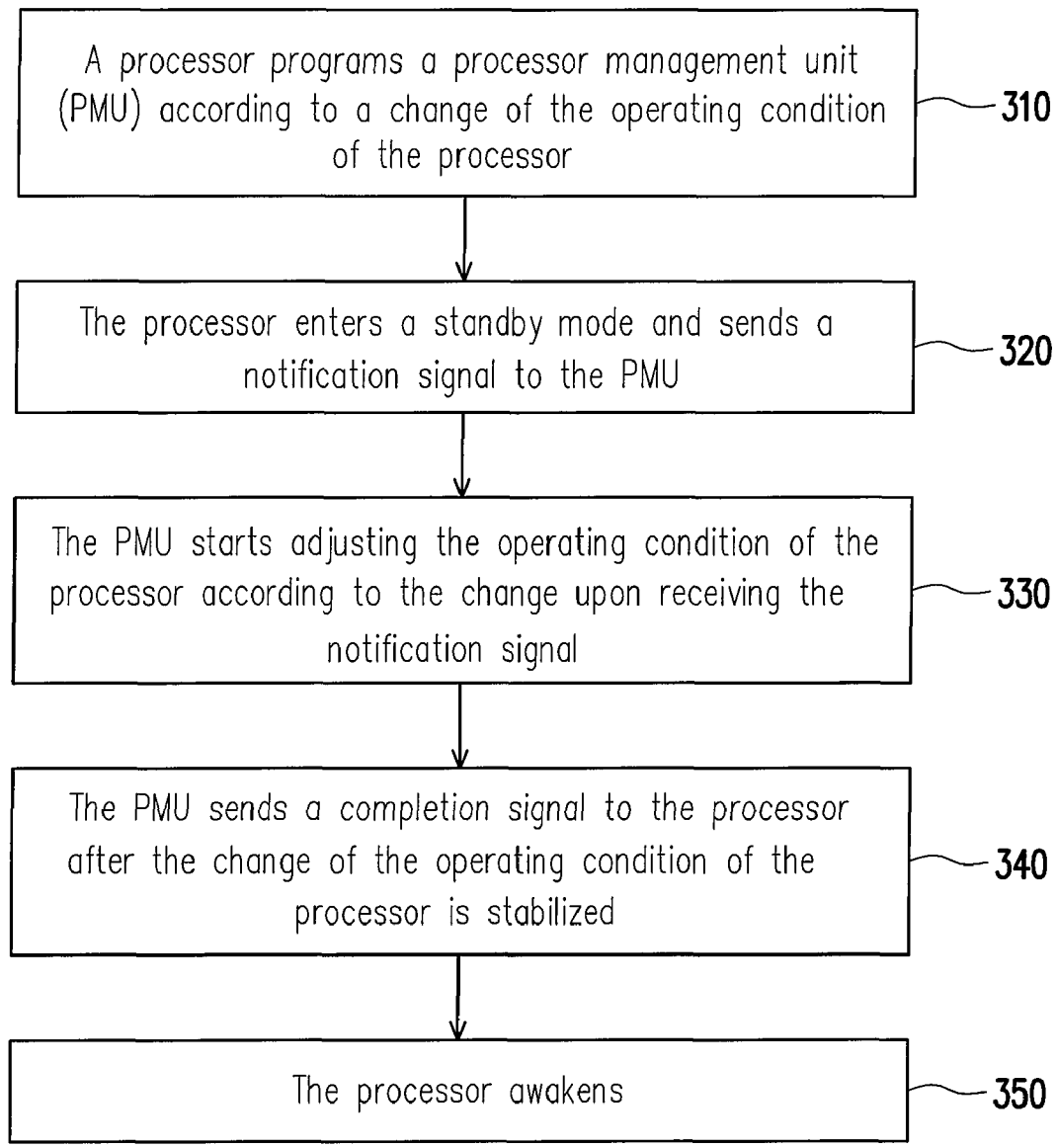

FIG. 3 is a flow chart of a method for controlling the processor 110 according to the second option mode of the standby instruction in this embodiment. Referring to FIG. 3, in step 310, when the processor 110 needs to run in a different operating condition, the change of the operating condition can be programmed by either the processor 110 itself or by another processor 130 into the PMU 120. Then in step 320, the processor 110 enters the standby mode by executing the standby instruction with the second option mode or by writing the second value into the standby control register, and sends a notification signal to the PMU 120.

In step 330, upon receiving the notification signal, the PMU 120 starts adjusting the operating condition of the processor 110 according to the change of the operating condition. As described in step 340, after the change of the new operating condition is completed, the PMU 120 sends a completion signal to the processor 110.

In step 350, the processor 110 awakens upon receiving the completion signal and resumes normal operation immediately according to the new operating condition set by the PMU 120. In this option mode, the processor 110 ignores any wakeup event after entering the standby mode until awakened by the completion signal.

Figure 4:
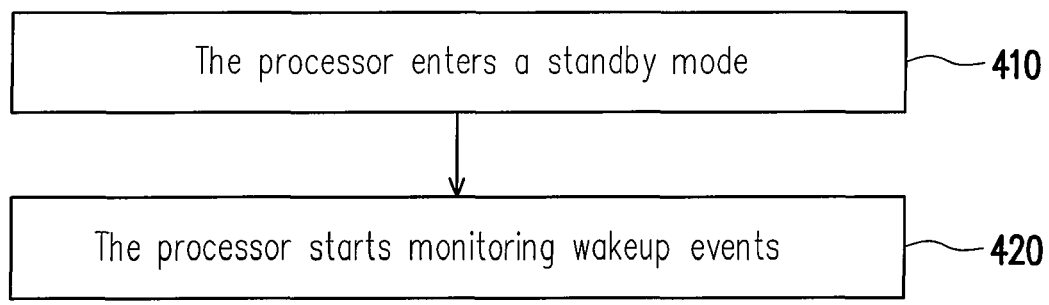

If the processor 110 needs no adjustment of the operating condition, the exchange of signals between the processor 110 and the PMU 120 is unneeded. FIG. 4 is a flow chart of a method for controlling the processor 110 according to the third option mode of the standby instruction in this embodiment. Referring to FIG. 4, in step 410, the processor 110 enters the standby mode without sending any signal to the PMU 120. In step 420, the processor 110 starts monitoring wakeup events immediately after entering the standby mode.

In view of the above, the present invention provides a computer system and a method for controlling a processor thereof. According to the above embodiments, a handshaking mechanism between the processor and the PMU is used for avoiding the unpredictable behavior caused by premature awakening of the processor during the adjustment the operating condition. Consequently, the stability and reliability of the computer system are improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for controlling a processor, comprising:
the processor or another processor programming a processor management unit (PMU) according to a change of the operating condition of the processor;
the processor entering a standby mode and sending a notification signal to the PMU;
the PMU starting adjusting the operating condition of the processor according to the change upon receiving the notification signal; and
the PMU sending a completion signal to the processor after the change of the operating condition of the processor is stabilized, wherein the processor enters the standby mode by executing a standby instruction, the standby instruction has three option modes, and in the first option mode, the processor enters the standby mode, sends the notification signal to the PMU, and starts monitoring wakeup events upon receiving the completion signal from the PMU;

in the second option mode, the processor enters the standby mode, sends the notification signal to the PMU, and wakes up upon receiving the completion signal from the PMU;

in the third option mode, the processor enters the standby mode without sending the notification signal, and then starts monitoring wakeup events.

2. The method of claim 1, wherein the operating condition of the processor includes at least one of the following: a supply voltage of the processor, an operating frequency of the processor, a register value of the processor, and an operating parameter of the processor.

3. The method of claim 2, wherein the operating parameter is stored in the processor, another processor or in a storage element.

4. The method of claim 1, wherein the processor comprises a plurality of function units and the operating condition of the processor includes the on/off states of the function units.

5. The method of claim 1, wherein the processor comprises a plurality of independent execution units and the operating condition of the processor includes the on/off states of the independent execution units.

6. A computer system, comprising:

one or more than one processor; and a processor management unit (PMU); wherein the processor which is about to change a operating condition or another processor programs the PMU according to a change of the operating condition of the processor, enters a standby mode, and sends a notification signal to the PMU;

the PMU starts adjusting the operating condition of the processor according to the change upon receiving the notification signal, and then sends a completion signal to the processor after the change of the operating condition of the processor is stabilized, wherein the processor enters the standby mode by executing a standby instruction, the standby instruction has three option modes; and in the first option mode, the processor enters the standby mode, sends the notification signal to the PMU, and starts monitoring wakeup events upon receiving the completion signal from the PMU;

in the second option mode, the processor enters the standby mode, sends the notification signal to the PMU, and wakes up upon receiving the completion signal from the PMU;

in the third option mode, the processor enters the standby mode without sending the notification signal, and then starts monitoring wakeup events.

7. The computer system of claim 6, wherein the operating condition of the processor includes at least one of the following: a supply voltage of the processor, an operating frequency of the processor, a register value of the processor, and an operating parameter of the processor.

8. The computer system of claim 7, wherein the operating parameter is stored in the processor, another processor or in a storage element.

9. The computer system of claim 6, wherein the processor comprises a plurality of function units and the operating condition of the processor includes the on/off states of the function units.

10. The computer system of claim 6, wherein the processor comprises a plurality of independent execution units and the operating condition of the processor includes the on/off states of the independent execution units.

11. A method for controlling a processor, comprising:

the processor or another processor programming a processor management unit (PMU) according to a change of the operating condition of the processor;

the processor entering a standby mode and sending a notification signal to the PMU;

the PMU starting adjusting the operating condition of the processor according to the change upon receiving the notification signal; and the PMU sending a completion signal to the processor after the change of the operating condition of the processor is stabilized, wherein the processor enters the standby mode by writing a predetermined value into a standby control register, the predetermined value is a first value, a second value or a third value, and if the standby control register is written with the first value, the processor enters the standby mode, sends the notification signal to the PMU, and starts monitoring wakeup events upon receiving the completion signal from the PMU;

if the standby control register is written with the second value, the processor enters the standby mode, sends the notification signal to the PMU, and wakes up upon receiving the completion signal from the PMU;

if the standby control register is written with the third value, the processor enters the standby mode without sending the notification signal, and then starts monitoring wakeup events.

12. A computer system, comprising:

one or more than one processor; and a processor management unit (PMU); wherein the processor which is about to change a operating condition or another processor programs the PMU according to a change of the operating condition of the processor, enters a standby mode, and sends a notification signal to the PMU;

the PMU starts adjusting the operating condition of the processor according to the change upon receiving the notification signal, and then sends a completion signal to the processor after the change of the operating condition of the processor is stabilized, wherein the processor enters the standby mode by writing a predetermined value into a standby control register, the predetermined value is a first value, a second value or a third value, and if the standby control register is written with the first value, the processor enters the standby mode, sends the notification signal to the PMU, and starts monitoring wakeup events upon receiving the completion signal from the PMU;

if the standby control register is written with the second value, the processor enters the standby mode, sends the notification signal to the PMU, and wakes up upon receiving the completion signal from the PMU;

if the standby control register is written with the third value, the processor enters the standby mode without sending the notification signal, and then starts monitoring wakeup events.

* * * * *